United States Patent [19]

Bell et al.

[11] Patent Number: 4,788,697

[45] Date of Patent: Nov. 29, 1988

[54] METHOD AND APPARATUS FOR SYNCHRONIZING A SIGNAL TO A TIME BASE

[75] Inventors: Derwin H. Bell, Philadelphia, Pa.; Chauncey Herring, Jr.; Jose M. Miranda, both of Trenton, N.J.

[73] Assignee: American Telephone & Telegraph Company, New York, N.Y.

[21] Appl. No.: 214

[22] Filed: Jan. 2, 1987

[51] Int. Cl.4 .............................................. H04L 7/06
[52] U.S. Cl. ..................................... 375/113; 375/97; 375/111
[58] Field of Search ................. 375/97, 102, 111, 106, 375/113; 370/85, 102, 84; 307/516, 517, 522, 523

[56] References Cited

U.S. PATENT DOCUMENTS

| | | | |
|---|---|---|---|
| 3,238,299 | 3/1966 | Lender | 370/84 |
| 3,369,182 | 2/1968 | Reindl | 375/25 |
| 3,567,959 | 3/1971 | Kaneko | 307/523 |
| 3,862,373 | 1/1975 | Cohen et al. | 370/84 |
| 3,882,305 | 5/1975 | Johnstone | 235/151.11 |
| 3,989,931 | 11/1976 | Phillips | 235/92 FQ |
| 4,001,504 | 1/1977 | Hendrickson | 375/121 |
| 4,021,616 | 5/1977 | Betts | 370/102 |
| 4,111,500 | 9/1978 | Peters | 364/900 |
| 4,213,006 | 7/1980 | Gerges | 375/97 |
| 4,280,224 | 7/1981 | Chethik | 375/116 |
| 4,466,111 | 8/1984 | Bennett | 375/111 |
| 4,577,334 | 3/1986 | Boer et al. | 375/97 |
| 4,663,766 | 5/1987 | Bremer | 375/121 |

FOREIGN PATENT DOCUMENTS 2057816  4/1981  United Kingdom ................. 375/97

OTHER PUBLICATIONS

"New Products," p. 197, Electronic Design, Oct. 31, 1985.

Primary Examiner—Robert L. Griffin
Assistant Examiner—Stephen Chin
Attorney, Agent, or Firm—Robert B. Levy

[57] ABSTRACT

Automatic selection of the rate at which a periodic signal is sampled to obtain a selected number of samples thereof within a predetermined interval is accomplished by first selecting the number of samples to be taken. The periodic signal is then sampled at an arbitrary rate, with the sampling being synchronized to the period of the signal. The number of samples obtained by sampling at the arbitrary rate is counted and compared to the chosen number of samples. If the counted number of samples is unequal to the chosen number of samples, then the arbitrary sampling rate is adjusted. The steps of sampling the signal, counting the number of samples, comparing the counted number to the chosen number of samples, and adjusting the arbitrary sampling rate are repeated until the counted number of samples equals the chosen number of samples, whereupon the adjusted arbitrary sampling rate becomes the selected sampling rate.

10 Claims, 4 Drawing Sheets

METHOD AND APPARATUS FOR SYNCHRONIZING A SIGNAL TO A TIME BASE

BACKGROUND OF THE INVENTION

1. Technical Field

This invention relates to a method and apparatus for determining the rate at which the amplitude of an analog signal is sampled to achieve synchronization of the samples to a time base.

2. Background Art

At the present time, diagnosis of faults within a large electronic system, such as a telephone switch within a central office, is usually performed by a field technician, using one or more pieces of electronic test equipment, such as an oscilloscope. The technician uses the oscilloscope to observe the waveform of one or more signals of interest within the electronic system. From the waveforms displayed on his or her oscilloscope, the technician can often diagnose the fault and take appropriate corrective action.

In some instances, the technician may be unable to diagnose the fault from the waveforms displayed on his or her oscilloscope. When the technician cannot diagnose the fault, a troubleshooting engineer, who is often at a location remote from the site of the electronic system, is contacted, usually by telephone. The troubleshooting engineer receives a verbal report from the technicain of the symptoms experienced by the electronic system, and from that report, the engineer may make a diagnosis, or may suggest that additional tests be carried out to find the cause of the fault.

The ability of the troubleshooting engineer to diagnose the fault or suggest what additional tests should be carried out is dependent on how well the engineer has interpreted the information provided by the technician. If, for instance, the technician has not properly described the waveform observed on his or her oscilloscope, then the troubleshooting engineer may be unable to diagnose the fault. The troubleshooting enginer may then have to travel to the site of the faulty electronic system in order to observe, first hand, the symptoms exhibited thereby and to examine the waveforms displayed on the technician's oscilloscope. Such travel is time consuming and expensive.

As an alternative to sending the troubleshooting engineer to the site of the faulty electronic system, electrical signals from the faulty system may be transmitted to the engineer, typically over the telephone line. In this way, the troubleshooting engineer may directly observe the waveform of such signals on an oscilloscope, thereby avoiding the problem of misinterpretation of the waveform by the technician. In practice, the electrical characteristics of most if not all the signals of interest within the faulty electronic system are such as to prevent the transmission thereof directly over the telephone line without degradation.

To facilitate transmission of the electrical signals on interest from the site of the faulty electronic equipment to the site of the troubleshooting engineer, the signals from the faulty equipment are first digitized by sampling the amplitude thereof at intervals equally spaced in time. The amplitude of the signal at each interval is translated into a digital value which is stored at one of a plurality of successive locations in a memory at the site of the faulty equipment. The digital values within the memory are transmitted serially across the telephone line to the site of the troubleshooting engineer by the aid of a pair of modems (modulator/demodulators), each located at a separate end of the line. After transmission across the telephone line, each digital sample is stored in a memory located at the site of the troubleshooting engineer. The stored values are then successively converted into analog signals by a digital-to-analog converter. When these analog signals are sequentially applied to the vertical input of an oscilloscope, a waveform will be displayed thereby closely resembling that displayed by the technician's oscilloscope.

The electrical signals transmitted to the site of the troubleshooting engineer will not be of much assistance if the amplitude versus time relationship of such signals becomes distorted during the digitizing process. Furthermore, the sampling of the amplitude of the signals from the faulty electronic system must be synchronized to some periodically occurring event. Otherwise, the successive waveforms displayed on the oscilloscope of the troubleshooting engineer will not be in the proper phase or time relationship.

Heretofore, the problem of maintaining the amplitude versus time relationship of the signals transmitted to the troubleshooting engineer has been solved by sampling the signals at a fixed rate over a given period of time to obtain a fixed number of samples. The sampling rate is typically chosen twice as high as the highest frequency signal of interest within the electronic system to insure faithful reproduction of the waveform therof on the oscilloscope of the troubleshooting engineer. Initiation of the sampling occurs at the start of each waveform traced by the technician's oscilloscope. The rate at which each waveform is traced by the technician's oscilloscope (known as the horizontal sweep rate) can be varied.

Fixing the sample rate twice as high as the highest frequency signals of interest will produce more than the required number of samples needed to accurately reproduce signals of a lower frequency. Since the maximum rate at which the digital values can be transmitted across an ordinary telephone line without degradation is fixed (typically 1200 baud), the larger the number of samples that must be transmitted, the longer the transmission time. To reduce transmission costs, the amount of information transmitted should be minimized. For this reason, it is undesirable to excessively sample the signals of interest within the electronic system.

Accordingly, there is a need to provide a method for automatically establishing the optimum rate at which a signal is to be sampled within a preselected interval so that a preselected number of samples are taken.

BRIEF SUMMARY OF THE INVENTION

Briefly, the foregoing disadvantages are substantially overcome by the method of the present invention for automatically selecting the optimum rate at which information is to be sampled to obtain a chosen number of samples within a predetermined interval. The method is initiated by choosing the number of samples to be taken of the information. Next, the information is sampled at an arbitrary rate. Thereafter, the number of samples obtained by sampling at the arbitrary rate is counted. The count is compared to the chosen number of samples. If the counted number of samples is different from the chosen number of samples, the arbitrary sampling rate is adjusted. The steps of sampling the signal, counting the number of samples, comparing the count thereof to the predetermined number of samples, and adjusting the arbitrary sampling rate are repeated until the counted number of samples equals the chosen number of samples, whereupon the adjusted arbitrary sampling rate becomes the selected sampling rate.

DETAILED DESCRIPTION

Figure 1:
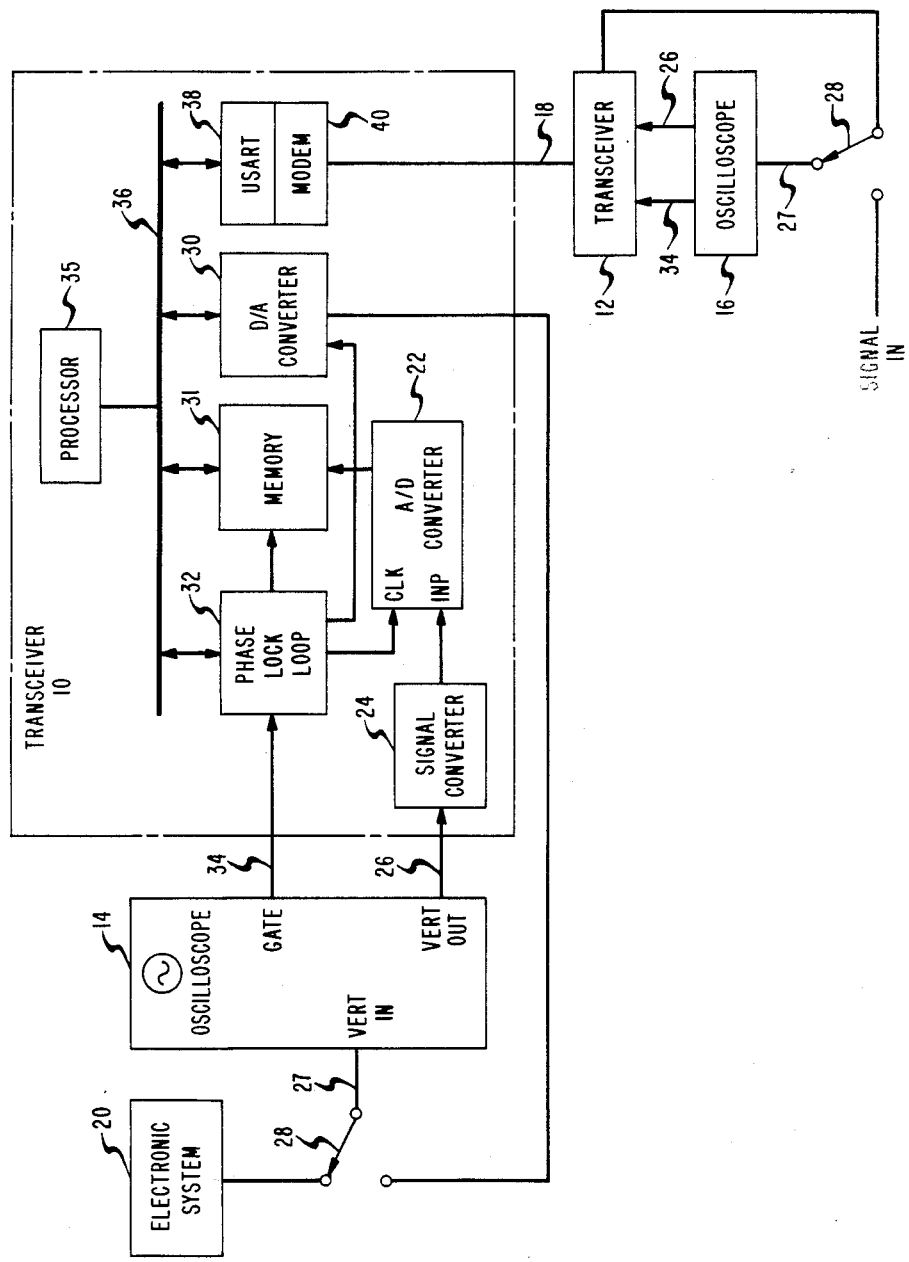
FIG. 1 is a block schematic diagram of a pair of transceivers according to the present invention for communicating information therebetween indicative of the waveform of an analog signal.

FIG. 1 is a block schematic diagram of a transceiver 10, constructed in accordance with the present invention. The transceiver 10 is coupled to a second transceiver 12 of identical construction and serves to transmit signals thereto which are indicative of the amplitude of a waveform displayed on an oscilloscope 14 at each of a plurality of intervals spaced in time. The transceiver 10 also serves to receive signals from the second transceiver 12, each indicative of the amplitude of a waveform displayed on an oscilloscope 16 at each of a plurality of spaced intervals.

In practice, the transceivers 10 and 12 are connected to each other via a telephone line 18, although other kinds of communication channels could be employed. Typically, the transceiver 10 and the oscilloscope 14 are both located at the site of a malfunctioning electronic system 20, such as a faulty telephone switch within a central office. The transceiver 12 and the oscilloscope 16 are situated remotely from the electronic system 20. Usually, the transceiver 12 and the oscilloscope 16 are located at the site of a troubleshooting engineer who may be hundreds of miles away from the electronic system 20.

Since transceivers 10 and 12 are of identical construction, only the transceiver 10 will be described in detail. As seen in FIG. 1, the transceiver 10 comprises an analog-to-digital (A/D) converter 22 which has a signal input (inp) coupled via a signal conditioner 24 (typically a protection buffer) to a vertical output 26 on the oscilloscope 14. The oscilloscope 14 has its vertical input 27 coupled by a switch 28 between the faulty electronic system 20 and to the output of a digital-to-analog (D/A) converter 30 within the transceiver 10. The signal applied to the vertical input 27 of the oscilloscope 14 appears at the vertical output 26 thereof. Thus, when the oscilloscope 14 has its vertical input 27 coupled to the electronic system 20, the same signal appearing at the vertical input will be supplied to the signal input (inp) of the A/D converter 22. The A/D converter 22 serves to sample the amplitude of the input signal supplied thereto and produce a digital signal representative of the signal amplitude each time the A/D converter is supplied with a signal at its clock (CLK) input. The A/D converter 22 has its output coupled to a memory 31, typically 4K by 8 bits wide, which serves to store digital samples produced by the A/D conveter.

The A/D converter 22 has its CLK input coupled to a phase lock loop (PLL) circuit 32 so as to receive clock signals therefrom. The frequency of the clock signal produced by the PLL circuit 32 is controlled in accordance with the frequency of a signal supplied thereto from a gate output 34 of the oscilloscope 14. The signal at the gate output 34 of the oscilloscope 14 appears as a train of pulses (not shown) of unitary amplitude. The duration of each pulse in the train varies inversely with the horizontal sweep rate established for the oscilloscope 14. The greater the horizontal sweep rate, the smaller the duration of each pulse appearing at the gate output 34. The interval between the pulses appearing at the gate output 34 corresponds to the delay between waveforms traced by the oscilloscope 14.

The A/D converter 22, the D/A converter 30, the memory 31 and the PLL circuit 32 are coupled to a processor 35 through a bus 36. In an exemplary embodiment, the processor 35 comprises a model 8085 microprocessor manufactured by Intel Corp., Santa Clara, Calif. The bus 36 also couples the processor 35 to a universal synchronous/asynchronous receive transmit (USART) circuit 38, which is well known in the art. The USART circuit 38 serves to couple the processor 35 to a modem 40 connected to one end of the telephone line 18. The modem 40 serves to serially transmit the digital values stored in the memory 31 to the transceiver 12 across the telephone line 18 in response to appropriate control signals received from the processor 35 via the bus 36.

The modem 40 also serves to receive digital values from the transceiver 12, indicative of successive amplitude samples of the waveform displayed by the oscilloscope 16. The digital values received from the transceiver 12 by the modem 40 are transferred to the memory 31 for storage. The stored values in the memory 31 previously received by the modem 40 are converted by the D/A converter 30 into successive dc voltages at a rate established by the phase lock loop circuit 32.

Figure 2:
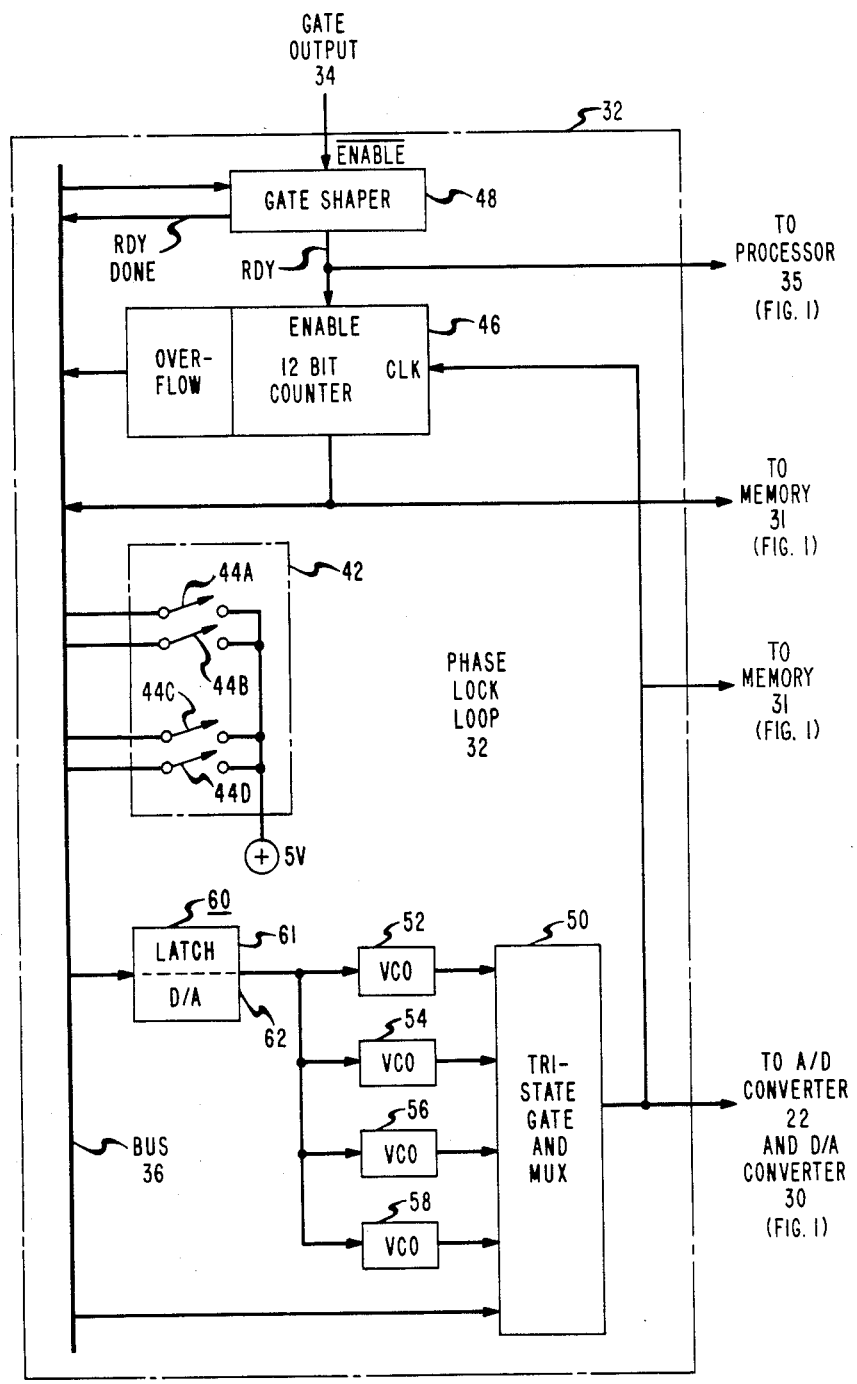
FIG. 2 is a block schematic diagram of a phase lock loop circuit comprising part of each transceiver of FIG. 1.

FIG. 2 is a block schematic diagram of the PLL circuit 32 of FIG. 1. The PLL circuit 32 comprises a switch assembly 42 comprised of four individual switches 44a–44d, each coupled between the bus 36 and a five-volt dc power supply. The switches 44a–44d are selectively actuated to designate how many of the digital values produced by the A/D converter 22 (FIG. 1) are to be stored in the memory 31 of FIG. 1. Table I lists the corresponding number of digital values to be stored when a particular one of the switches 44a–44d is actuated.

TABLE I

| Switch No. | No. of Samples |
|---|---|
| 44a | 4096 |
| 44b | 2048 |
| 44c | 1024 |
| 44d | 512 |

The PLL circuit 32 also includes a counter 46 which is twelve bits wide. Thus the counter 46 counts from zero to $2^{12}$ (4095) before generating an overflow signal. Both the count of the counter 46 and the overflow signal produced thereby are supplied to the processor 35 of FIG. 1 via the bus 36. The count of the counter 46 is also supplied to the memory 31 of FIG. 1 to designate the address of location within the memory where the individual digital samples taken by the A/D converter 22 of FIG. 1 are to be stored.

The PLL circuit 32 further includes a gate-shaper circuit 48, which is coupled to the gate output 34 of the oscilloscope 14 of FIG. 1 and to the processor 35 of FIG. 1. The gate-shaper circuit 48 (described in greater detail in FIG. 3) supplies the counter 46 at the enable input thereof with a ready signal (RDY) which is at a logic "one" level at the beginning of the first full or complete pulse appearing at the gate output 34. At the end of the first full pulse at the gate output 34, the RDY signal produced by the gate-shaper circuit 34 drops to a logic "zero" level. Each time the gate-shaper circuit 48 produces a logic "one" level RDY signal, the counter 46 resets itself and then begins to count. The count of the counter 46 is supplied to the processor 35 and is stored in the memory 31. When the RDY signal drops to a logic "zero" level, the counter 46 ceases to count.

The counter 46 has its clock input (CLK) coupled to the output of a tri-state gate and multiplezer circuit 50, hereinafter reffered to as the MUX circuit. The output of the MUX circuit 50 is also coupled to the clock input (CLK) of the A/D converter 22 of FIG. 1 and to the memory 31 of FIG. 1. The MUX circuit 50 has four separate inputs, each coupled to a separate one of four voltage-controlled oscillators (VCOs) 52, 54, 56 and 58 which produce clock signals for the A/D converter 22, the memory 31, the counter 46 and the D/A converter 30 of FIG. 1.

Each of the VCOs 52, 54, 56 and 58 produces a square wave output signal whose frequency varies within a limited range in accordance with the magnitude of the voltage supplied thereto. Each of the VCOs 52, 54, 56 and 58 has a limited frequency range, typically 2 or 3 MHz. The frequency range of the VCO 58 is higher than that of VCO 56. Similarly, the frequency range of VCO 56 is higher than that of VCO 54, and so on. However, there is some overlap between the frequency ranges, so, for example, the highest frequency signal produced by the VCO 52 is slightly greater than the lowest frequency signal that can be produced by the VCO 54. To achieve a desired frequency range of 0-10 MHz for the clock signals supplied to the A/D converter 22, the counter 46 and the memory 31, four separate VCOs 52, 54, 56 and 58 were required. The maximum frequency of the clock signal was chosen to be 10 MHz to enable at least two samples to be taken by the A/D converter 22 of the input signal supplied thereto when the horizontal sweep rate of the oscilloscope 14 is set at 5 MHz.

A successive approximation register (SAR) 60 is coupled between the bus 36 and the input of each of the VCOs 52, 54, 56 and 58. The SAR 60 includes a latch 61 which serves to store a digital word supplied thereto from the processor 35 (see FIG. 1), indicative of the desired voltage to be supplied to each of the VCOs 52-58. The SAR 60 also incudes a digital-to-analog (D/A) converter 62 which converts the digital word stored in the latch 61 into the desired voltage supplied to the VCOs 52-58.

The VCOs 52-58 are simultaneously supplied with voltage from the D/A converter 60. Thus, all four VCOs 52-58 operate to produce an output signal at the same time. However, it is desirable that the output signal from only a single one of the VCOs 52-58 be supplied to the counter 46, the A/D converter 22 of FIG. 1, and the memory 31 at any given time. To this end, the MUX circuit 50 serves to pass only the output signal from a selected one of the VCOs 52-58 in accordance with a control signal supplied to the MUX circuit from the processor 35 (see FIG. 1) via the bus 36.

Figure 3:
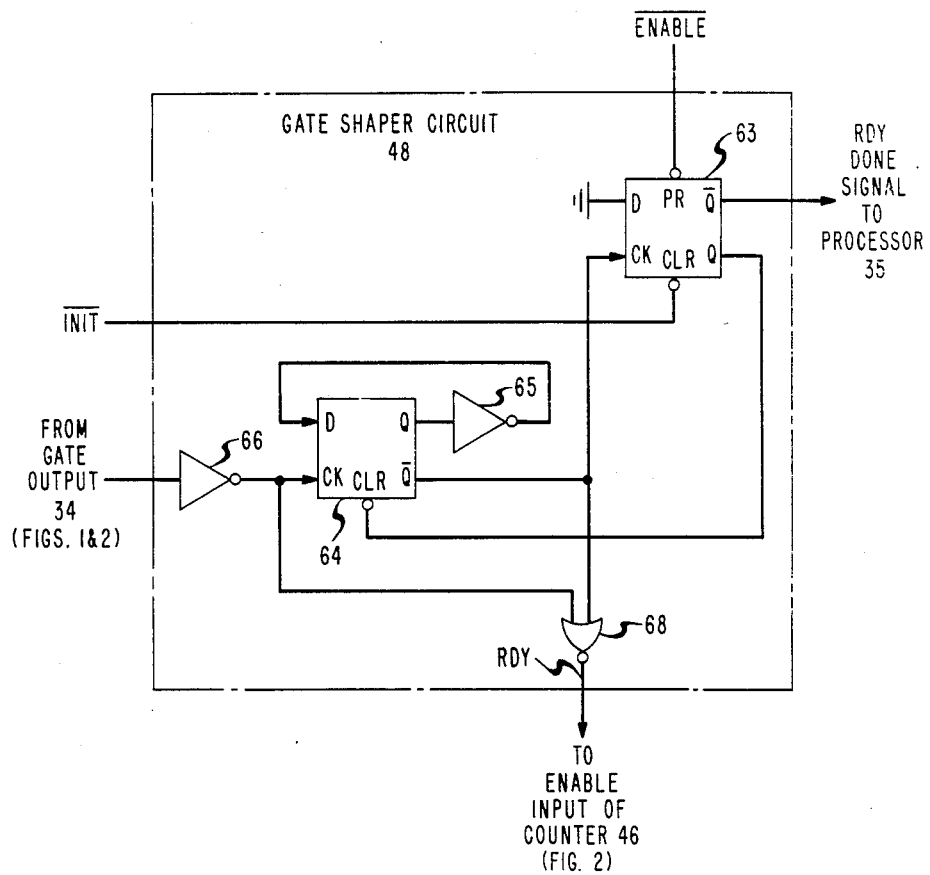
FIG. 3 is a block schematic diagram of a gate-shaper circuit comprising a portion of the phase lock loop circuit of FIG. 2.

FIG. 3 is a block schematic diagram of the gate-shaper circuit 48, which comprises a pair of D-type flip-flop circuits 63 and 64. The flip-flop 63 has preset (PR) and clear (CLR) inputs, each supplied from the processor 35 (see FIG. 1) with a separate one of a pair of signals $\overline{ENABLE}$ and $\overline{INIT}$, respectively. The flip-flop 63 has a D input coupled to circuit ground and has a Q output coupled to a clear input (CLR) of the flip-flop 64. At the $\overline{Q}$ output of the flip-flop 68, there is produced a signal (RDY DONE) which is supplied to the processor 35.

The flip-flop 64 has a D input thereto coupled to a Q output thereof via an inverter 65. An inverter 66 couples the gate output 34 (see FIGS. 1 and 2) of the oscilloscope 14 (see FIG. 1) to a clock (CLK) input of the flip-flop 64. The flip-flop 64 has a $\overline{Q}$ output thereof coupled both to the clock (CLK) input of the flip-flop 63 and one of a pair of inputs of a NOR gate 68. The other pair of inputs to the NOR gate 68 is coupled to the clock input (CLK) of the flip-flop 64. The NOR gate 68 produces the RDY signal at the output thereof which is supplied to the enable input of the counter 46 (see FIG. 2).

The PLL circuit 32 operates as follows to adjust the rate at which the A/D converter 22 (see FIG. 2) samples the input signal supplied thereto to assure that a preselected number of samples are taken during a predetermined interval. Initially, the processor 35 (see FIG. 2) loads the latch 61 of FIG. 2 with a digital value which will cause each of the VCOs 52-58 of FIG. 2 to produce the lowest frequency output signal within its particular range. At the same time, the processor 35 causes the MUX circuit 50 of FIG. 2 to pass only the output signal of VCO 52 to the counter 46, the A/D converter 22 of FIG. 1 and the memory 31.

Next, the processor 35 supplies a logic "zero" level $\overline{INIT}$ signal pulse to the CLR input of the flip-flop 63 of FIG. 3, causing its flip-flop to be cleared. Upon being cleared, the flip-flop 63 will produce logic "zero" and logic "one" level signals at the Q and $\overline{Q}$ outputs thereof. The presence of a logic "zero" level signal at the Q output of the flip-flop 63 causes the flip-flop 64 to be cleared so that logic "zero" and logic "one" level signals appear at the Q and $\overline{Q}$ outputs thereof.

Thereafter, the processor 35 of FIG. 1 supplies a logic "zero" level $\overline{ENABLE}$ signal pulse to the preset (PR) input of the flip-flop 63, causing logic "one" and logic "zero" level signals to appear at the Q and $\overline{Q}$ outputs thereof. The presence of a logic "one" level signal at the Q output of the flip-flop 63 causes a logic "one" level signal to appear at the CLR input of the flip-flop 64. As a result, the flip-flop 64 becomes enabled, thereby allowing the Q and $\overline{Q}$ output signals produced thereby to change states when the flip-flop is clocked, as will occur when the signal at the CLK input thereof undergoes a transition from a logic "zero" to a logic "one" level. However, until the flip-flop 64 is clocked, the signal at the $\overline{Q}$ thereof remains at a logic "one" level, causing a RDY signal produced by the NOR gate 63 to remain at a logic "zero" level.

The flip-flop 64 is clocked upon the occurrence of the end of the first full or partial pulse appearing at the gate output 34 of FIG. 1. The $\overline{Q}$ output signal of the flip-flop 64 now drops to a logic "zero" level. When the flip-flop 64 is clocked, the output signal of the inverter 66 rises to a logic "one" level, thereby keeping the RDY signal produced by the NOR gate 68 at a logic "zero" level. At the beginning of the next full pulse appearing at the gate output 34, the output signal of the inverter 66 will drop to a logic "zero" level. With the signal at the $\overline{Q}$ output of the flip-flop 64 still at a logic "zero" level, the NOR gate 68 now produces a logic "one" level RDY signal, so the counter 46 now becomes enabled and commences counting. While enabled, the counter 46 counts at a rate which is dependent on the frequency of the output signal of the MUX circuit 50 of FIG. 2. The rate at which the A/D converter 22 samples the input signal thereto, and the rate at which the memory 31 (see FIG. 1) is clocked to control the receipt of digital samples from the A/D converter are also controlled by the frequency of the output signal of the MUX circuit 50.

At the completion of the pulse presently appearing at the gate output 34, the flip-flop 64 is again clocked, causing Q and $\overline{Q}$ output signals thereof to change to logic "zero" and logic "one" levels. As a result, the RDY signal produced by the NOR gate 68 drops to a logic "zero" level. When the flip-flop 64 is clocked for the second time, the flip-flop 63 becomes clocked thereby. The flip-flop 63 now supplies the processor 35 with a logic "one" level RDY DONE signal, indicating that the RDY signal has dropped to a logic "zero" level. At the same time, the flip-flop 63 supplies a logic "zero" level to the CLR input of the flip-flop 64, thereby preventing the output signals of the latter device from changing states. Only when the flip-flop 63 is resupplied by the processor 35 with a logic "zero" level $\overline{\text{ENABLE}}$ signal will the output signals of the flip-flop 64 change states.

Once the RDY signal drops to a logic "zero" level, the counter 46 ceases counting. The count of the counter 46, which specifies the location in the memory 31 which is filled with each suppressive sample from the A/D converter 22, no longer increases, so no more new samples are stored in the memory.

Upon receipt of the RDY DONE signal, the processor 35 examines the counter 46, which has now ceased counting, to see if an overflow occurred. If no overflow occurred, the gate-shaper circuit 48 is again actuated to enable the counter 46 to count upon the occurrence of the next full pulse appearing at the gate output 34. At the same time, the processor 35 causes the MUX circuit 50 to pass the output signal of the VCO 54 to the A/D converter, the memory 31 and the counter 46 rather than the output signal of the VCO 52.

If the processor 35 again detects no overflow after the counter 46 has ceased counting, then the above steps are repeated, except that the processor now causes the MUX circuit 50 to pass to the output signal of the VCO 56, rather than the VCO 54. Should the output signal of the VCO 56 be of too low a frequency to cause the counter 46 to overflow, then the process is repeated again. However, this time, the signal from the VCO 58 is passed by the MUX circuit 50 to the counter 46, the A/D converter 22 and the memory 31 rather than the signal from the VCO 56.

The failure of the counter 46 to overflow when clocked by the lowest frequency signal produced by the VCO 58 will cause the processor 35 to supply the latch 61 with a larger valued word prior to re-enabling the gate-shaper circuit 48. This causes the voltage supplied to the VCO 58 to increase so that the frequency of the output signal thereof increases. The value of the word stored in the latch 61 is successively increased to cause the counter 46 to overflow. The occurrence of an overflow under such conditions indicates that the A/D converter 22 of FIG. 2 is being clocked fast enough. In other words, during the interval while a single waveform is traced by the oscilloscope 14, the A/D converter 22 can fill each of the preselected number of locations in the memory 31 (see FIG. 1) with a successive digital value. As will be recalled, each digital value produced by the A/D converter 22 represents the amplitude of the waveform of the oscilloscope 14 at a separate one of a plurality of spaced intervals.

In some instances, the highest frequency output signal of the VCO 58 may not be sufficient to clock the A/D converter 22 fast enough to fill the preselected number of successive locations in the memory 31 during the interval while each single waveform is being traced by the oscilloscope 14 (see FIG. 1). Under such conditions, the processor 35 will fail to receive an overflow signal from the counter 46 before receiving the RDY DONE signal. When the processor 35 fails to receive the overflow signal, an error condition is indicated. One way in which the error condition can be relieved is to decrease the sweep rate of the oscilloscope 14, thereby increasing the period during which the A/D converter 22 can sample the signal supplied thereto.

It is possible that when the VCOs 54–58 are operated at their lowest frequency, the output signal of one of these VCOs may cause the counter 46 to overflow. When the processor 35 detects an overflow under these conditions, it may be that the rate at which the counter 46 and the A/D converter 22 of FIG. 1 are being clocked is too fast. In other words, the counter 46 may be clocked so fast by one of the VCOs 54, 56 or 58 that the counter overflows well before the RDY signal changes.

If, for example, the counter 46 overflowed when clocked with the lowest frequency output signal of the VCO 54, then an overflow condition may be accomplished by clocking the counter with the highest frequency output signal from the VCO 52 since the frequency ranges of the VCOs overlap to some degree. When the processor 35 detects an overflow condition caused by clocking the counter 46 with the lowest frequency signal from one of the VCOs 54, 56 and 58, the processor causes the MUX circuit 50 to pass only the output signal from the VCO of the next lower frequency range. Thereafter, the value of the word stored in the latch 61, and hence the voltage supplied to the VCOs 52–58, is adjusted by the processor 35 (see FIG. 1) until the counter 64 is again made to overflow. When the counter 46 overflows now, the A/D converter 22 (see FIG. 1) is being clocked fast enough to fill the memory 31 (see FIG. 1) with the preselected number of samples before the RDY signal changes state.

Figure 4:
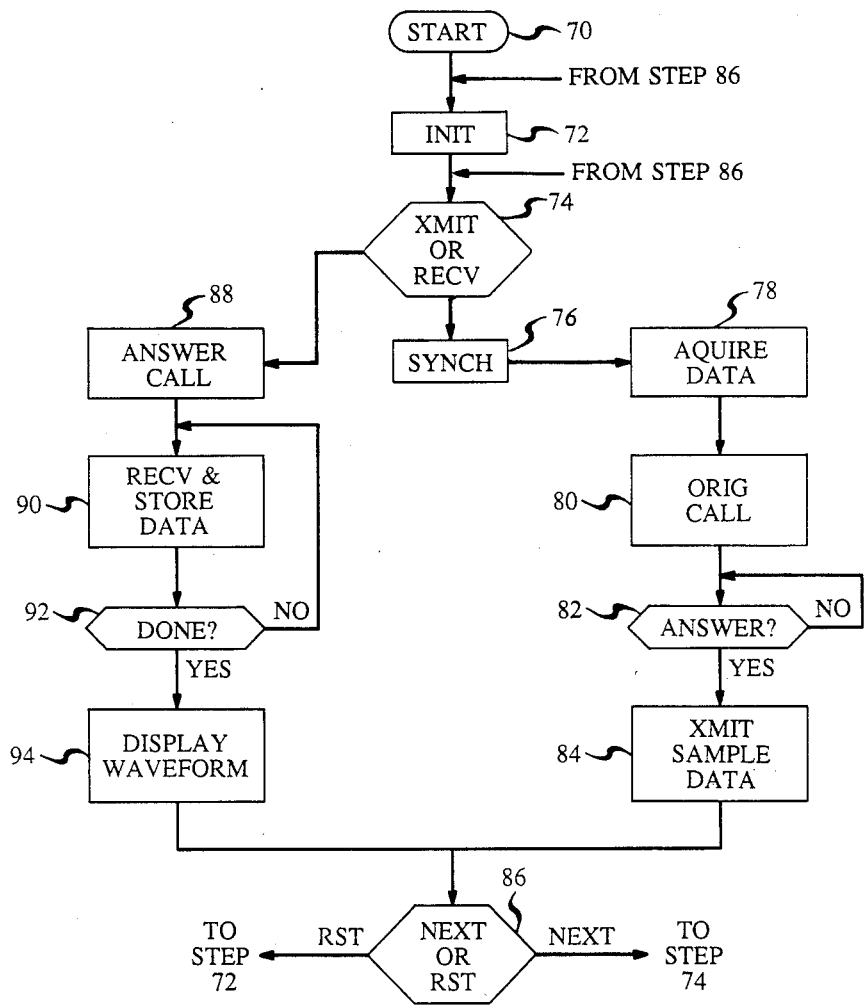
FIG. 4 is a flowchart representation of a program for controlling the transceiver of FIG. 1.

Referring to FIG. 4, there is shown a flowchart representation of a program which is executed by the processor 35 of FIG. 1 to control operation of the transceiver 10 of FIG. 1. At the outset of the program, the processor 35 executes a start instruction (step 70) during which time the processor resets its internal registers. Thereafter, the processor 35 clears the gate-shaped circuit 48 (see FIGS. 2 and 3) by supplying the $\overline{\text{INIT}}$ signal pulse thereto (step 72). Next, the processor 35 determines whether the transceiver 10 is to send or receive data (step 74). Generally, the operator will signal the processor 35 which of these operations is to occur.

When the transceiver 10 is to send data, then following step 74, the processor 35 initiates the synchronization of the clock rate of the A/D converter 22 to the oscilloscope 14 of FIG. 1 by supplying the $\overline{\text{ENABLE}}$ signal pulse to the gate-shaper circuit 40 (step 76). Thereafter, digitized samples of the waveform appearing on the oscilloscope 14 are taken by the A/D converter 22 and stored in the memory 31 (step 78). Next, the processor 35 supplies control signals, via the USART circuit 38 of FIG. 1, to the modem 40 of FIG. 1 to cause the modem to originate a call to the transceiver 12 of FIG. 1 (step 80). After the call is initiated, the modem 40 checks to see whether the modem (not shown) within the transceiver 12 has answered the call (step 82). If no answer is received, the modem 40 checks again. Only when the call has been answered will the digitized samples be transmitted to the transceiver 12 (step 84).

Once the digitized samples are transmitted, the processor 35 determines whether a restart command (RST) has been entered, or whether the processor should next re-execute step 74 and those following it. If there has been a restart command, then program execution branches back to step 72. Otherwise, program execution branches back to step 74.

When the transceiver 10 is to receive rather than send data, then following step 74, the modem 40 serves to answer an incoming call (step 88) originated by transceiver 12 (or any other one which may be sending data). Next, data is sent to the transceiver 10 and is then stored in the memory 31 (step 90). After the data is received and stored, the processor 35 determines whether more data is to be received (step 92). If more data is to be received, then program execution branches back to step 90. Otherwise, following step 92, the received data, which in this case represents the digitized samples of the analog waveform displayed by the oscilloscope 16 at each of a plurality of spaced intervals, is converted into an analog voltage by the D/A converter 30. This analog voltage is displayed on the oscilloscope 14, yielding a waveform closely approximating that of the sampled signal (step 94). After step 94, program execution branches to step 86 described previously.

It is to be understood that the embodiments herein described are merely illustrative of the principles of the present invention. Various modifications and changes may be made by those skilled in the art which will embody the principles of the invention and fall within the spirit and scope thereof.

What is claimed is:

1. A method of communicating data across a communications channel comprising the steps of:
    establishing a rate at which said data is to be sampled;
    sampling said data at said established rate; and
    transmitting the samples taken of said data across said communications channel, CHARACTERIZED IN THAT said establishing step comprises the step of:
    choosing how many samples are to be taken of said data;
    sampling said data at an arbitrary rate;
    counting the number of samples obtained by sampling said data at the arbitrary rate;
    comparing the counted number of samples to the chosen number of samples;
    adjusting the arbitrary sampling rate when the counted number of samples differs from the chosen number of samples; and
    repeating the sampling, counting, comparing and ajusting steps until the counted number of samples equals the chosen number of samples, whereupon said adjusted rate becomes the established sampling rate.

2. The method according to claim 1, CHARACTERIZED IN THAT said selecting step further includes the steps of preselecting the length of the period during which the samples are to be taken.

3. A method of communicating information indicative of the waveform of a periodic signal across a communications channel comprising the steps of:
    selecting a rate at which said signal is to be sampled;
    sampling said signal at said selected rate; and
    transmitting the samples taken of said signal across said communications channel, CHARACTERIZED IN THAT said selecting step comprises the steps of:
    choosing how many samples of said signal are to be taken during a complete period thereof;
    sampling said signal at an arbitrary sampling rate;
    counting the number of samples obtained by sampling at said arbitrary rate;
    comparing the counted number of samples to the chosen number of samples;
    adjusting the arbitrary sampling rate when the counted number of samples differs from the chosen number of samples; and
    repeating the sampling, counting, comparing and adjusting steps until the counted number of samples equals the chosen number of samples, whereupon said adjusted arbitrary rate becomes said selected sampling rate.

4. The method according to claim 3, CHARACTERIZED IN THAT sampling said signal at said arbitrary rate comprises the steps of:
    determining the inception of the first complete period of said signal; and
    commencing the sampling at the inception of the first complete period of the signal and continuing the sampling only for the duration thereof.

5. The method according to claim 3, CHARACTERIZED IN THAT said selecting step further includes the steps of preselecting the length of the period during which the samples are to be taken.

6. A method of replicating the waveform of a periodic signal at a site remote from the occurrence thereof so that the replica waveform is synchronized to the signal, comprising the steps of:
    sampling the amplitude of the periodic signal;
    converting each of the amplitudes into a corresponding digital value;
    transmitting the digital values to the remote site across a communications channel;
    converting each of the digital values into an analog voltage having a corresponding magnitude, CHARACTERIZED IN THAT said periodic signal is automatically sampled at a rate selected rate to obtain a predetermined number of samples during the first full period of said signal, said sampling being accomplished by:
    choosing how many samples of said signal are to be taken during the period thereof;
    sampling and signal at an arbitrary rate with such sampling commencing at the beginning of the first full period thereof;
    counting the number of samples obtained by sampling at said arbitrary rate;
    comparing the counted number of samples to the chosen number of samples;

adjusting the arbitrary sampling rate when the counted number of samples differs from the chosen number of samples; and repeating the sampling, counting, comparing and adjusting steps, until the counted number of samples equals the chosen number of samples, whereupon said adjusted arbitrary sampling rate becomes the selected sampling rate.

7. Apparatus for communicating data across a communications channel comprising:

means for establishing a rate at which such data is to be sampled;

means for sampling said data at said established rate; and means for transmitting the samples of said data across said communications channel, CHARACTERIZED IN THAT said sampling rate establishing means includes:

means for choosing how many samples are to be taken of said data;

means for sampling said data at an arbitrary rate;

means for counting the number of samples taken at said arbitrary sampling rate;

means coupled to said counting means and said choosing means for comparing the counted number of samples to the chosen number of samples; and means coupled to said comparing means and said sampling means for adjusting the arbitrary sampling rate until the counted number of samples equals the chosen number of samples, whereupon the adjusted arbitrary sampling rate becomes the established sampling rate.

8. The apparatus according to claim 7, CHARACTERIZED IN THAT said means for sampling the signal at said arbitrary rate comprises:

an analog-to-digital converter; and means for periodically clocking the analog-to-digital converter.

9. The apparatus according to the claim 8, CHARACTERIZED IN THAT said means for clocking said analog-to-digital converter comprises:

a plurality of voltage-controlled oscillators, each producing an output signal within a predetermined range of frequencies in accordance with the magnitude of the voltage applied thereto.

10. The apparatus according to claim 9, CHARACTERIZED IN THAT said means for adjusting the sampling rate comprises:

means for applying a voltage to each of the voltage-controlled oscillators;

means for selectively transmitting the output signal of one of said voltage-controlled oscillators to said analog-to-digital converter; and means for controlling the voltage applied by said voltage-applying means in accordance with the difference between said counted number of samples and said chosen number of samples.

* * * * *